(12) United States Patent
Li et al.

(10) Patent No.: US 8,743,880 B2
(45) Date of Patent: Jun. 3, 2014

(54) MIMO TRANSMISSION BASED METHOD FOR TRANSMITTING AND RECEIVING DOWNLINK CONTROL INFORMATION

(75) Inventors: Yingyang Li, Beijing (CN); Chengjun Sun, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 13/636,823

(22) PCT Filed: Apr. 1, 2011

(86) PCT No.: PCT/KR2011/002270
§ 371 (c)(1),
(2), (4) Date: Sep. 24, 2012

(87) PCT Pub. No.: WO2011/122900
PCT Pub. Date: Oct. 6, 2011

(65) Prior Publication Data
US 2013/0010850 A1 Jan. 10, 2013

(30) Foreign Application Priority Data
Apr. 2, 2010 (CN) .......................... 2010 1 0142130

(51) Int. Cl.
*H04L 12/28* (2006.01)
(52) U.S. Cl.
USPC ............................ 370/392; 370/252; 375/219
(58) Field of Classification Search
USPC ......... 370/252, 328–329, 335–336, 341–343, 370/345, 389, 392, 432, 437, 441–442, 465, 370/479–480
See application file for complete search history.

(56) References Cited

U.S. PATENT DOCUMENTS

| | | | |
|---|---|---|---|
| 2009/0088148 A1 | 4/2009 | Chung et al. | |
| 2009/0225737 A1 | 9/2009 | Kim et al. | |
| 2010/0068993 A1 | 3/2010 | Khan | |
| 2010/0195614 A1 | 8/2010 | Nimbalker et al. | |
| 2010/0303034 A1* | 12/2010 | Chen et al. | 370/329 |
| 2011/0116455 A1* | 5/2011 | Damnjanovic et al. | 370/329 |
| 2011/0141987 A1* | 6/2011 | Nam et al. | 370/329 |
| 2011/0243079 A1* | 10/2011 | Chen et al. | 370/329 |
| 2012/0008556 A1* | 1/2012 | Noh et al. | 370/328 |
| 2012/0113944 A1* | 5/2012 | Yang et al. | 370/329 |
| 2012/0170525 A1* | 7/2012 | Sorrentino | 370/329 |
| 2012/0207111 A1* | 8/2012 | Jang et al. | 370/329 |
| 2012/0213167 A1* | 8/2012 | Xu et al. | 370/329 |
| 2013/0114479 A1* | 5/2013 | Seo et al. | 370/281 |

* cited by examiner

*Primary Examiner* — Kevin Mew
(74) *Attorney, Agent, or Firm* — Jefferson IP Law, LLP

(57) ABSTRACT

A Multi-Input Multi-Output (MIMO) transmission based method for transmitting and receiving Downlink Control Information (DCI) is provided. The method includes if it is determined that two TBs are currently needed to be dispatched, indicating information of layer numbers and precoding matrixes of uplink MIMO transmission with a precoding information domain in DCI for dispatching the uplink MIMO transmission, and transmitting the DCI, and if it is determined that one Transport Block (TB) is currently needed to be dispatched, indicating the information of the layer numbers and precoding matrixes of the uplink MIMO transmission with redundant information in the DCI and precoding information domain, and transmitting the DCI. The present invention may save bit number of the precoding information domain and reduce the signaling overheads of the DCI.

20 Claims, 4 Drawing Sheets

MIMO TRANSMISSION BASED METHOD FOR TRANSMITTING AND RECEIVING DOWNLINK CONTROL INFORMATION

This application is a National Stage application under 35 U.S.C. §371 of an International application filed on Apr. 1, 2011 and assigned application No. PCT/KR2011/002270, and claims the benefit under 35 U.S.C. §365(b) of a Chinese patent application filed in the Chinese Intellectual Property Office on Apr. 2, 2010 and assigned Serial No. 201010142130.0, the entire disclosure of which is hereby incorporated by reference.

BACKGROUND OF THE INVENTION

1. Field of the Invention

The present invention relates to wireless communication technology field. More particularly, the present invention relates to a Multi-Input Multi-Output (MIMO) transmission based method for transmitting and receiving Downlink Control Information (DCI).

2. Description of the Related Art

In the Long Term Evolution-Advanced (LTE-A) system, in order to improve the performance of the uplink, the MIMO technology is adopted for transmitting data. The uplink physical layer transmission technology of the LTE-A is the same as that of the LTE system, but is still based on the Single Carrier Frequency Division Multiple Access (SCFDMA).

Two pieces of important information (i.e. layer number transmitted of the uplink MIMO (hereafter referred as the layer number) and precoding matrix information) need to be indicated in the DCI dispatching the uplink MIMO transmission. According to the present development of LTE-A technology, as for a dual-antenna User Equipment (UE), when the allocated layer number is 1, the number of the precoding matrixes is 6. When the allocated number is 2, the number of the precoding matrix is 1. As for a four-antenna UE, when the allocated layer number is 1, the number of the precoding matrixes is 24. When the allocated layer number is 2, the number of the precoding matrixes is 16. When the allocated layer number is 3, the number of the precoding matrixes is 12. When the allocated layer number is 4, the number of the precoding matrix is 1. According to the present conclusion, as for the dual-antenna UE, 3 bits signaling is used for indicating the allocated layer numbers and the precoding matrixes. Accordingly, as for the four-antenna UE, 6 bits signaling is used for indicating the allocated layer numbers and the precoding matrixes.

Table 1 is an example of a DCI format for dispatching the uplink MIMO transmission, which is similar to that for dispatching the downlink MIMO transmission in the Long Term Evolution (LTE). New Data Indication (NDI) domains, and Modulation and Coding Scheme (MCS) domains (i.e., NDI0, NDI1, MCS0 and MCS1) in the table are set for each Transport Block (TB). When a base station actually transmits two TBs, the NDI and MCS of the two TBs respectively indicate parameters of the corresponding TBs. When the base station merely transmits one TB, the TB is denoted as TB0, the NDI0 and MCS0 corresponding to the TB0 indicate the parameters of the TB0. In addition, when the DCI needs to indicate that another TB is not activated, the TB is denoted as TB1. The NDI and MCS information domains corresponding to the TB1 do not indicate the transmission parameters of the TB1. At present, the indication information of the layer numbers and precoding matrixes of the uplink MIMO transmission is indicated in the precoding information domain of the DCI. At least 3 bits precoding information domain is needed for the dual-antenna UE, and at least 6 bits precoding information domain is needed for the four-antenna UE. As for this method according to the related art, the mode for indicating the layer numbers and precoding matrixes makes the DCI occupy too many signaling overheads.

TABLE 1

| Information domain | Bit number |
| --- | --- |
| Resource allocation | Undetermined |
| MCS (TB0) | 5 |
| MCS (TB1) | 5 |
| NDI (TB0) | 1 |
| NDI (TB1) | 1 |
| TPC | 2 |
| CSI | 3 |
| Frequency modulation indication | 0 or 1 |
| CQI request | 1 |
| Precoding information | 3 or 6 |
| Switching indication | 0 or 1 |
| SRS activation | 1 |
| CRC (C-RNTI) | 16 |

Therefore, a need exists for a MIMO transmission based method for transmitting and receiving DCI, to reduce the signaling overheads of the DCI.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a Multi-Input Multi-Output (MIMO) transmission based method for transmitting and receiving DCI, to reduce the signaling overheads of the Downlink Control Information (DCI).

Another aspect of the present invention is to provide a method and an apparatus for representing layer numbers and precoding matrix information through DCI in an MIMO transmission based system.

In accordance with an aspect of the present invention, a MIMO transmission based method for transmitting DCI is provided. The method includes determining the number of Transport Blocks (TBs) currently needed to be dispatched, when two TBs are currently needed to be dispatched, indicating information of layer numbers and precoding matrixes of uplink MIMO transmission with a precoding information domain in DCI for dispatching the uplink MIMO transmission, when one TB is currently needed to be dispatched, indicating the information of the layer numbers and precoding matrixes of the uplink MIMO transmission with redundant information in the DCI and precoding information domain, and transmitting the DCI.

In accordance with another aspect of the present invention, an apparatus for transmitting Downlink Control Information (DCI) in a Multi-Input Multi-Output (MIMO) transmission based system is provided. The apparatus includes a controller for determining the number of Transport Blocks (TBs) that need to be transmitted currently, wherein the controller is configured such that when two TBs need to be transmitted currently, the controller represents information of precoding matrixes and layer numbers for uplink MIMO transmission through a precoding information domain of DCI for uplink MIMO transmission, and such that when one TB needs to be transmitted currently, the controller represents information of precoding matrixes and layer numbers for uplink MIMO transmission through the precoding information domain and redundant information within the DCI, and a transceiver for transmitting the DCI.

In accordance with another aspect of the present invention, a MIMO transmission based method for receiving DCI is provided. The method includes receiving DCI for dispatching uplink MIMO transmission, obtaining information for indicating layer numbers and precoding matrixes of the uplink MIMO transmission from a precoding information domain of the DCI if the DCI indicates that two TBs are dispatched, and obtaining the information for indicating the layer numbers and precoding matrixes of the uplink MIMO transmission from redundant information and the precoding information domain of the DCI if one Transport Block (TB) is dispatched.

In accordance with another aspect of the present invention, an apparatus for receiving Downlink Control Information (DCI) in a Multi-Input Multi-Output (MIMO) transmission based system is provided. The apparatus includes a transceiver for receiving the DCI for uplink MIMO transmission; and a controller for, when the DCI represents that two Transport Blocks (TBs) are transmitted, obtaining information for representing layer numbers and precoding matrixes for the uplink MIMO transmission from a precoding information domain of the DCI, and for, when the DCI represents that one TB is transmitted, obtaining information for representing precoding matrixes and layer numbers of the uplink MIMO transmission from the precoding information domain and redundant information of the DCI.

In view of the above technical scheme, the present invention adequately uses the characteristic that bit numbers needed for indicating the information of the layer numbers and precoding matrixes when one TB is dispatched is larger than that needed when two TBs are dispatched. The situation of dispatching two TBs is distinguished from that of dispatching one TB. When one TB is dispatched, the redundant information in the DCI is used for aiding the precoding information domain in indicating the information of the layer numbers and the precoding matrixes. Thereby, bit numbers of the precoding information domain are saved, and the signaling overheads of the DCI are reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
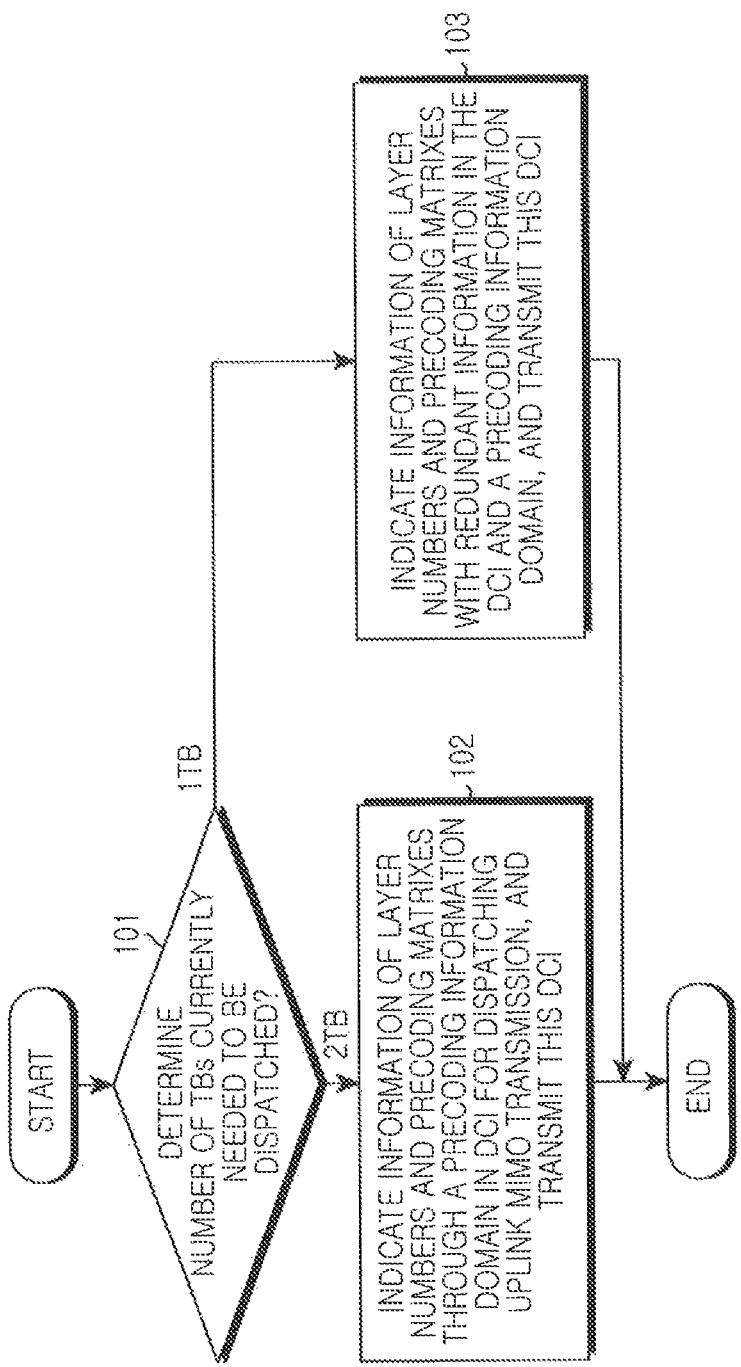
FIG. 1 is a flowchart illustrating a major method for transmitting Downlink Control Information (DCI) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Because the number of the Transport Blocks (TBs) needed to be transmitted is different according to the current channel condition and the amount of data needed to be transmitted in the Multi-Input Multi-Output (MIMO)-based data transmission, two TBs may be transmitted simultaneously, or only one TB may be transmitted. According to the difference of the number of the TBs, the corresponding layer number and the number of the precoding matrixes needed to be indicated are different.

As for the four-antenna User Equipment (UE), when the UE transmits data of two TBs, the layer number must be larger than or equal to 2. According to the transmission conclusion of the uplink MIMO transmission in the present Long Term Evolution-Advanced (LTE-A), the number of the precoding matrixes is 16 if the layer number is 2, the number of the precoding matrixes is 12 if the layer number is 3, and the number of the precoding matrix is 1 if the layer number is 4. Thus, when the indication information of the layer number and the precoding matrix adopts a mode of united indication, 29 (i.e., 16 plus 12 plus 1) combinations need to be occupied, that is to say, 5 bits indication information is needed. When the UE merely transmits one TB, if the TB is new data, the layer number is 1 and the number of the precoding matrixes is 24; if the TB is re-transmitted data, the layer number may be 1 or 2. That is to say, when the TB is the re-transmitted data, the number of the precoding matrixes is 24 if the layer number is 1, and the number of the precoding matrixes is 16 if the layer number is 2. Thus, the number of the precoding matrixes needed to be indicated needs 40 (i.e., 24 plus 16) combinations (i.e., 6 bits indication information is needed).

As for the dual-antenna UE, when the UE transmits two TBs data, the layer number must be equal to 2, and the number of the precoding matrix is 1. When the UE merely transmits one TB data, the layer number must be equal to 1, the number of the precoding matrixes is 6, and 3 bits indication information is needed.

The above analysis shows that the number of bits which indicate the layer number and the precoding matrix when transmitting one TB data is larger than that when transmitting two TBs data. In view of this characteristic, the method provided by exemplary embodiments of the present invention may be shown in FIG. 1.

FIG. 1 is a flowchart illustrating a method for transmitting DCI according to an exemplary embodiment of the present invention.

Referring to FIG. 1, the number of TBs needed to be dispatched is determined in step 101. If there are two TBs currently needed to be dispatched, the method for transmitting DCI proceeds to step 102; if there is merely one TB currently needed to be dispatched, the method for transmitting DCI proceeds to step 103.

In step 102, regarding the DCI for dispatching the uplink MIMO transmission, the DCI is transmitted through the information of the precoding information domain for indicating the layer number and the precoding matrix. As an example, the method for transmitting DCI is thereafter terminated.

In step 103, the DCI is transmitted with redundant information in the DCI and the information of the precoding information domain for indicating the layer number and the precoding matrix. As an example, the method for transmitting DCI is thereafter terminated.

Figure 2:
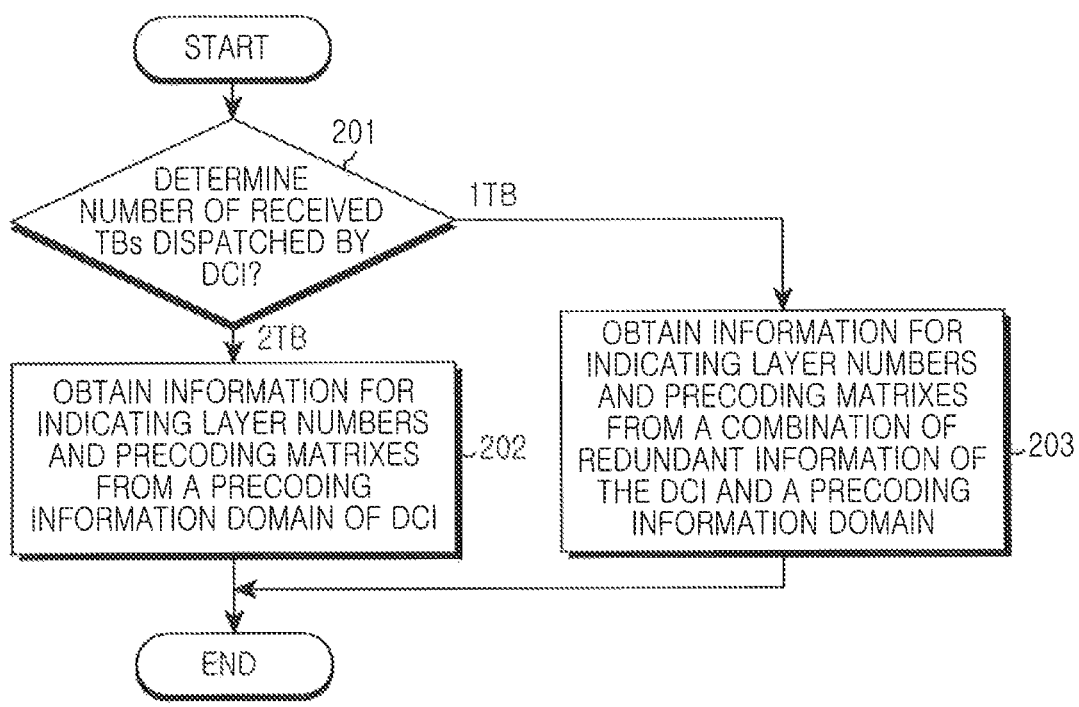
FIG. 2 is a flowchart illustrating a major method for receiving DCI according to an exemplary embodiment of the present invention.

An exemplary implementation flow of the UE may be shown in FIG. 2.

FIG. 2 is a flowchart illustrating a method for receiving DCI according to an exemplary embodiment of the present invention.

Referring to FIG. 2, the DCI for dispatching the uplink MIMO transmission is received in step 201. For example, in step 201, the number of received TBs dispatched by DCI is determined. If the DCI indicates that the number of dispatched TBs is 2, then the method for receiving DCI proceeds to step 202; in contrast, if the DCI indicates that the number of dispatched TBs is 1, then the method for receiving DCI proceeds to step 203.

In step 202, the information for indicating the layer numbers and precoding matrixes is obtained from the precoding information domain of the DCI. As an example, the method for receiving DCI is thereafter terminated.

In step 203, the information indicating the layer numbers and the precoding matrixes is obtained from the redundant information and precoding information domain of the DCI. As an example, the method for receiving DCI is thereafter terminated.

Figure 3:
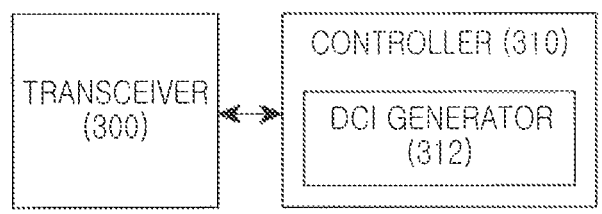
FIG. 3 is a block diagram illustrating a base station according to an exemplary embodiment of the present invention.

FIG. 3 is a block diagram illustrating a base station according to an exemplary embodiment of the present invention.

Referring to FIG. 3, the base station includes a transceiver 300 and a controller 310. More particularly, the controller 310 includes a DCI generator 312.

The transceiver 300 processes a signal transmitted/received to/from a UE under control of the controller 310. More particularly, the transceiver 300 transmits DCI to the UE under control of the controller 310 in accordance with an exemplary embodiment of the present invention.

The controller 310 controls an overal operation of the base station, and controls and processes a function for generating and transmitting DCI by including the DCI generator 312 in accordance with an exemplary embodiment of the present invention. The DCI generator 312 determines the number of TBs that need to be transmitted currently. When it is determined that two TBs need to be transmitted, the DCI generator 312 generates the DCI representing precoding matrixes and layer numbers through information of a precoding information domain with respect to the DCI for uplink MIMO transmission. In contrast, when it is determined that one TB needs to be transmitted, the DCI generator 312 generates the DCI representing precoding matrixes and layer numbers through information of a precoding information domain and redundant information of the DCI. After that, the controller 310 controls and processes a function for transmitting the generated DCI to a UE via the transceiver 300.

Figure 4:
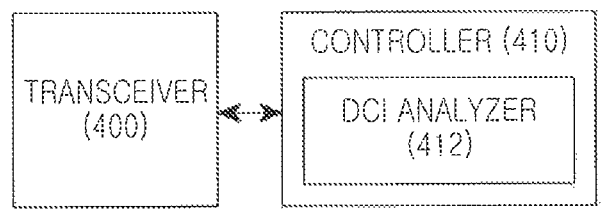
FIG. 4 is a block diagram illustrating a User Equipment (UE) according to an exemplary embodiment of the present invention.

FIG. 4 is a block diagram illustrating a UE according to an exemplary embodiment of the present invention.

Referring to FIG. 4, the UE includes a transceiver 400 and a controller 410. More particularly, the controller 410 includes a DCI analyzer 412.

The transceiver 400 processes a signal transmitted/received to/from a base station under control of the controller 410. More particularly, the transceiver 400 receives DCI from the base station and provides the same to the controller 410 in accordance with an exemplary embodiment of the present invention. The transceiver 400 may support two antennas and may support four antennas.

The controller 410 controls an overal operation of the UE, and controls and processes a function for analyzing DCI received from the base station by including the DCI analyzer 412. The DCI analyzer 412 determines the number of transmitted TBs through DCI received via the transceiver 400. When the number of TBs transmitted through the DCI is 2, the DCI analyzer 412 obtains information for representing the layer numbers and precoding matrix information from a precoding information domain of the received DCI. In contrast, when the number of TBs transmitted through the DCI is 1, the DCI analyzer 412 obtains information for representing the layer numbers and precoding matrix information from a precoding information domain and redundant information of the received DCI.

As for the MIMO-based data transmission, when two TBs need to be dispatched, the NDIs and MCSs of the two TBs in the DCI format respectively indicate transmission parameters of the corresponding TB. Thus, the special precoding information domain can only be used for indicating the information of the layer numbers and precoding matrixes of the two TBs.

When only one TB, denoted as TB0, is dispatched, NDI0 and MCS0 indicate the transmission parameters of TB0. While the other TB, denoted as TB1, is not activated. In this situation, there are many ways for indicating that TB1 is not activated. Accordingly, there are many ways for indicating the information of the layer numbers and precoding matrixes. Exemplary embodiments of the present invention are listed hereafter for detailed description.

First Exemplary Embodiment

If the inactivity of TB1 is not indicated with the NDI1 domain corresponding to TB1 in the DCI, but indicated with a specific value in the MCS1 domain of TB1 or indicated with the MCS1 domain of the TB1 and other control information in addition to the two NDI and MCS bits of the TB (exemplary embodiments of the present invention are not limited to the specific method for indicating the inactivity of TB1), the NDI1 domain of TB1 becomes idle bits which may be aid in indicating the information of the layer numbers and precoding matrixes of TB0.

The description of the example of the four-antenna UE is first given. When the Base Station (BS) dispatches UE and sends two TBs, 5 bits precoding information domain is needed for indicating the 29 possible layer numbers and precoding matrixes obtained from the above analysis. Correspondingly, when the UE receives the DCI, if it is determined that the BS dispatches two TBs, the information for indicating the layer numbers and precoding matrixes is obtained from the 5 bits precoding information domain.

When the BS dispatches the UE and merely sends one TB, the 40 possible layer numbers and precoding matrixes obtained from the above analysis may be indicated with 6 bits obtained by combing one bit idle NDI1 and 5 bits precoding information domain. Correspondingly, when the UE receives the DCI, if it is determined that the BS dispatches one TB (TB0), the information for indicating the layer number and the precoding matrix may be obtained by combing 1 bit NDI1 and 5 bits precoding information domain. It is obvious that compared with the method according to the related art which requires 6 bits precoding information domain, this method saves 1 bit signaling overhead.

Table 2 is an indication example of the information of the layer numbers and precoding matrixes. The indication example includes the NDIs of the inactivated TB (i.e., combinations which are obtained by combining the NDI1 domain and the precoding information domain) and indicates the information of various layer numbers and precoding matrixes in sequence. Precoding Matric Indicator (PMI) represents the indication information of the precoding matrix. Table 3 is another indication example of the information of the layer numbers and precoding matrixes. The NDI of the inactivated TB is the NDI1 domain indication the layer number information of TB0.

TABLE 2

| | One activated TB | | Two activated TBs | |
|---|---|---|---|---|
| NDI1 | Precoding information domain | Indication information | Precoding information domain | Indication information |
| 0 | 0 | 1 layer; PMI = 0 | 0 | 2 layers; PMI = 0 |
| 0 | 1 | 1 layer; PMI = 1 | 1 | 2 layers; PMI = 1 |
| 0 | 2 | 1 layer; PMI = 2 | 2 | 2 layers; PMI = 2 |
| 0 | 3 | 1 layer; PMI = 3 | 3 | 2 layers; PMI = 3 |
| 0 | 4 | 1 layer; PMI = 4 | 4 | 2 layers; PMI = 4 |
| 0 | 5 | 1 layer; PMI = 5 | 5 | 2 layers; PMI = 5 |
| 0 | 6 | 1 layer; PMI = 6 | 6 | 2 layers; PMI = 6 |
| 0 | 7 | 1 layer; PMI = 7 | 7 | 2 layers; PMI = 7 |
| 0 | 8 | 1 layer; PMI = 8 | 8 | 2 layers; PMI = 8 |
| 0 | 9 | 1 layer; PMI = 9 | 9 | 2 layers; PMI = 9 |
| 0 | 10 | 1 layer; PMI = 10 | 10 | 2 layers; PMI = 10 |
| 0 | 11 | 1 layer; PMI = 11 | 11 | 2 layers; PMI = 11 |
| 0 | 12 | 1 layer; PMI = 12 | 12 | 2 layers; PMI = 12 |
| 0 | 13 | 1 layer; PMI = 13 | 13 | 2 layers; PMI = 13 |
| 0 | 14 | 1 layer; PMI = 14 | 14 | 2 layers; PMI = 14 |
| 0 | 15 | 1 layer; PMI = 15 | 15 | 2 layers; PMI = 15 |
| 0 | 16 | 1 layer; PMI = 16 | 16 | 3 layers; PMI = 0 |
| 0 | 17 | 1 layer; PMI = 17 | 17 | 3 layers; PMI = 1 |
| 0 | 18 | 1 layer; PMI = 18 | 18 | 3 layers; PMI = 2 |
| 0 | 19 | 1 layer; PMI = 19 | 19 | 3 layers; PMI = 3 |
| 0 | 20 | 1 layer; PMI = 20 | 20 | 3 layers; PMI = 4 |
| 0 | 21 | 1 layer; PMI = 21 | 21 | 3 layers; PMI = 5 |
| 0 | 22 | 1 layer; PMI = 22 | 22 | 3 layers; PMI = 6 |
| 0 | 23 | 1 layer; PMI = 23 | 23 | 3 layers; PMI = 7 |
| 0 | 24 | 2 layers; PMI = 0 | 24 | 3 layers; PMI = 8 |
| 0 | 25 | 2 layers; PMI = 1 | 25 | 3 layers; PMI = 9 |
| 0 | 26 | 2 layers; PMI = 2 | 26 | 3 layers; PMI = 10 |
| 0 | 27 | 2 layers; PMI = 3 | 27 | 3 layers; PMI = 11 |
| 0 | 28 | 2 layers; PMI = 4 | 28 | 4 layers; PMI = 0 |
| 0 | 29 | 2 layers; PMI = 5 | 29~31 | Reserved |
| 0 | 30 | 2 layers; PMI = 6 | | |
| 0 | 31 | 2 layers; PMI = 7 | | |
| 1 | 0 | 2 layers; PMI = 8 | | |
| 1 | 1 | 2 layers; PMI = 9 | | |
| 1 | 2 | 2 layers; PMI = 10 | | |
| 1 | 3 | 2 layers; PMI = 11 | | |
| 1 | 4 | 2 layers; PMI = 12 | | |
| 1 | 5 | 2 layers; PMI = 13 | | |
| 1 | 6 | 2 layers; PMI = 14 | | |
| 1 | 7 | 2 layers; PMI = 15 | | |
| 1 | 8~31 | Reserved | | |

TABLE 3

| | One activated TB | | Two activated TBs | |
|---|---|---|---|---|
| NDI1 | Precoding information domain | Indication information | NDI1 | Indication information |
| 0 | 0 | 1 layer; PMI = 0 | 0 | 2 layers; PMI = 0 |
| 0 | 1 | 1 layer; PMI = 1 | 1 | 2 layers; PMI = 1 |
| 0 | 2 | 1 layer; PMI = 2 | 2 | 2 layers; PMI = 2 |
| 0 | 3 | 1 layer; PMI = 3 | 3 | 2 layers; PMI = 3 |
| 0 | 4 | 1 layer; PMI = 4 | 4 | 2 layers; PMI = 4 |
| 0 | 5 | 1 layer; PMI = 5 | 5 | 2 layers; PMI = 5 |
| 0 | 6 | 1 layer; PMI = 6 | 6 | 2 layers; PMI = 6 |
| 0 | 7 | 1 layer; PMI = 7 | 7 | 2 layers; PMI = 7 |
| 0 | 8 | 1 layer; PMI = 8 | 8 | 2 layers; PMI = 8 |
| 0 | 9 | 1 layer; PMI = 9 | 9 | 2 layers; PMI = 9 |
| 0 | 10 | 1 layer; PMI = 10 | 10 | 2 layers; PMI = 10 |
| 0 | 11 | 1 layer; PMI = 11 | 11 | 2 layers; PMI = 11 |
| 0 | 12 | 1 layer; PMI = 12 | 12 | 2 layers; PMI = 12 |
| 0 | 13 | 1 layer; PMI = 13 | 13 | 2 layers; PMI = 13 |
| 0 | 14 | 1 layer; PMI = 14 | 14 | 2 layers; PMI = 14 |
| 0 | 15 | 1 layer; PMI = 15 | 15 | 2 layers; PMI = 15 |
| 0 | 16 | 1 layer; PMI = 16 | 16 | 3 layers; PMI = 0 |
| 0 | 17 | 1 layer; PMI = 17 | 17 | 3 layers; PMI = 1 |
| 0 | 18 | 1 layer; PMI = 18 | 18 | 3 layers; PMI = 2 |
| 0 | 19 | 1 layer; PMI = 19 | 19 | 3 layers; PMI = 3 |
| 0 | 20 | 1 layer; PMI = 20 | 20 | 3 layers; PMI = 4 |
| 0 | 21 | 1 layer; PMI = 21 | 21 | 3 layers; PMI = 5 |
| 0 | 22 | 1 layer; PMI = 22 | 22 | 3 layers; PMI = 6 |
| 0 | 23 | 1 layer; PMI = 23 | 23 | 3 layers; PMI = 7 |
| 0 | 24~31 | Reserved | 24 | 3 layers; PMI = 8 |
| 1 | 0 | 2 layers; PMI = 0 | 25 | 3 layers; PMI = 9 |
| 1 | 1 | 2 layers; PMI = 1 | 26 | 3 layers; PMI = 10 |
| 1 | 2 | 2 layers; PMI = 2 | 27 | 3 layers; PMI = 11 |
| 1 | 3 | 2 layers; PMI = 3 | 28 | 4 layers; PMI = 0 |
| 1 | 4 | 2 layers; PMI = 4 | 29~31 | Reserved |
| 1 | 5 | 2 layers; PMI = 5 | | |
| 1 | 6 | 2 layers; PMI = 6 | | |
| 1 | 7 | 2 layers; PMI = 7 | | |
| 1 | 8 | 2 layers; PMI = 8 | | |
| 1 | 9 | 2 layers; PMI = 9 | | |
| 1 | 10 | 2 layers; PMI = 10 | | |
| 1 | 11 | 2 layers; PMI = 11 | | |
| 1 | 12 | 2 layers; PMI = 12 | | |
| 1 | 13 | 2 layers; PMI = 13 | | |
| 1 | 14 | 2 layers; PMI = 14 | | |
| 1 | 15 | 2 layers; PMI = 15 | | |
| 1 | 16~31 | Reserved | | |

The description of the example of the dual-antenna UE is given hereafter. When the BS dispatches UE and sends two TBs, 2 bits precoding information domain is adopted for indicating the 1 possible layer number and precoding matrix obtained from the above analysis. Correspondingly, when the UE receives the DCI, if it is determined that the BS dispatches two TBs, the information for indicating the layer numbers and precoding matrixes is obtained from the 2 bits precoding information domain.

When the BS dispatches the UE and merely sends one TB, the 6 possible layer numbers and precoding matrixes obtained from the above analysis may be indicated with 3 bits obtained by combing 1 bit idle NDI1 and 2 bits precoding information domain. Correspondingly, when the UE receives the DCI, if it is determined that the BS dispatches two TBs, the 3 bits information for indicating the layer number and the precoding matrix may be obtained by combing 1 bit idle NDI1 and 2 bits precoding information domain. In contrast to the method according to the related art, which requires 3 bits precoding information domain, this method saves 1 bit signaling overhead. Table 4 is an indication example of the information of this situation of the layer numbers and precoding matrixes.

TABLE 4

| | One activated TB | | Two activated TBs | |
|---|---|---|---|---|
| NDI1 | Precoding information domain | Indication information | Precoding information domain | Indication information |
| 0 | 0 | 1 layer; PMI = 0 | 0 | 2 layers; PMI = 0 |
| 0 | 1 | 1 layer; PMI = 1 | 1~3 | Reserved |
| 0 | 2 | 1 layer; PMI = 2 | | |
| 0 | 3 | 1 layer; PMI = 3 | | |
| 1 | 0 | 1 layer; PMI = 4 | | |
| 1 | 1 | 1 layer; PMI = 5 | | |
| 1 | 2~3 | Reserved | | |

Second Exemplary Embodiment

If the inactivity of TB1 is not indicated with the NDI1 domain and MCS1 domain of TB1 in the DCI, but indicated with other control information in addition to the two NDI and MCS domains of the TB in the DCI, the NDI1 domain and MCS1 domain of TB1 become idle bits. Thus, both the NDI1 and MCS1 of TB1 may be aid in indicating the information of the layer numbers and precoding matrixes of TB0. The information indication methods of this mode are not listed in detail. As for the UE, when the UE receives the DCI, if it is determined that the BS dispatches one TB, the information for indicating the layer number and the precoding matrix of the TB may be obtained by combing the NDI1 domain, MCS1 domain and precoding information domain. For instance, the method for aiding in indicating the information of the layer numbers and precoding matrixes with the NDI1 described in the first exemplary embodiment of the present invention is still applicable.

In addition, more bits are required in this situation. When the UE is equipped with two transmission antennae, because 3 bits indication information is needed at most, the precoding information domain is even not included in the DCI, that is to say, the precoding information may be transmitted without increasing signaling overheads. Thus, when two TBs are dispatched simultaneously, because the layer number can only be 2, and there is only one precoding matrix with two layers, no signaling indication is needed. When only one TB is dispatched, the currently-used precoding matrix with one layer is indicated with 3 bits in the NDI1 and MCS1 domains of the TB1. In this situation, as for the UE, when the UE receives the DCI, if it is determined that the BS dispatches one TB, the information for indicating the layer number and the precoding matrix of the TB may be obtained by combing the NDI1 domain and MCS1 domain.

Certainly, in this second exemplary embodiment of the present invention, the information of the layer numbers and precoding matrixes may also be indicated with the combination of the MCS1 domain and precoding matrix information domain.

Third Exemplary Embodiment

If the NDI1 domain and MCS1 domain of TB1, or the NDI domain and MCS domain of TB1 and other control information in addition to the two NDI and MCS bits of the TB are occupied for indicating the inactivation of TB1, although no independent domain in the DCI is idle, generally speaking, there may be various combinations of values of the control information for indicating the inactivation of TB1. In this exemplary embodiment of the present invention, the information of the layer numbers and precoding matrixes of TB0 may be indicated with the combination of the various combinations of the control information for indicating the inactivation of TB1 and the precoding information domain. Specifically speaking, suppose that the number of the combinations of the control information for indicating the inactivation of TB1 is N, partial or all of the N combinations may be aid in indicating the information of the layer numbers and precoding matrixes of TB0.

Suppose that the NDI domain and MCS domain of TB1, i.e. the NDI1 domain and MCS1 domain are used for indicating the inactivation of TB1, the method for indicating the inactivation of TB1 may be that the value of NDI1 indicates that TB1 is new data. It generally shows that the value of NDI1 domain changes and the value of MCS1 domain is one of 29-31. Such a combination of the NDI1 domain and MCS domain is not a valid status. Because the value of MCS1 being one of 29 to 31 merely includes information about Redundancy Version (RV), but does not includes the information of Transport Block Size (TBS), such MCS information is not enough to support the transmission of a new TB. Thus, the combination of this value is not a valid status, but may be used for indicating the inactivation of TB1. In this exemplary embodiment of the present invention, the combinations of these three values may be aid in indicating the information of layer number and precoding matrix of TB0.

As for the four-antenna UE, when the BS dispatches UE and sends two TBs, 5 bits precoding information domain is needed for indicating the 29 possible layer numbers and precoding matrixes obtained from the above analysis.

When the BS dispatches the UE and merely sends one TB, the combination of two different values of NDI1 domain and MCS1 domain is used for indicating the inactivation of TB1. For instance, NDI1 indicates new data, while the value of MCS1 domain is 29 or 30. The combination of these two different values actually equals to 1 bit information. Thus, 6 bits may be obtained by combing the 1 bit information and 5 bits precoding information domain to indicate 40 possibilities obtained from the above analysis. Correspondingly, when the UE receives the DCI, if it is determined that the BS dispatches one TB, the information for indicating the layer number and the precoding matrix of TB0 may be obtained from the combination of the values in the NDI1 domain and MCS1 domain for indicating the inactivation of TB1 and 5 bits precoding information domain.

Table 5 is a four-antenna indication example of the information of the layer numbers and precoding matrixes. Table 6 is another example. Referring to Table 6, the value of MCS1 may be used for indicating the layer number of currently-transmitted TB0.

TABLE 5

| | | One activated TB | | Two activated TBs | |
|---|---|---|---|---|---|
| NDI1 | MCS1 | Precoding information domain | Indication information | Precoding information domain | Indication information |
| Change | 29 | 0 | 1 layer; PMI = 0 | 0 | 2 layers; PMI = 0 |
| Change | 29 | 1 | 1 layer; PMI = 1 | 1 | 2 layers; PMI = 1 |
| Change | 29 | 2 | 1 layer; PMI = 2 | 2 | 2 layers; PMI = 2 |
| Change | 29 | 3 | 1 layer; PMI = 3 | 3 | 2 layers; PMI = 3 |
| Change | 29 | 4 | 1 layer; PMI = 4 | 4 | 2 layers; PMI = 4 |
| Change | 29 | 5 | 1 layer; PMI = 5 | 5 | 2 layers; PMI = 5 |
| Change | 29 | 6 | 1 layer; PMI = 6 | 6 | 2 layers; PMI = 6 |
| Change | 29 | 7 | 1 layer; PMI = 7 | 7 | 2 layers; PMI = 7 |
| Change | 29 | 8 | 1 layer; PMI = 8 | 8 | 2 layers; PMI = 8 |
| Change | 29 | 9 | 1 layer; PMI = 9 | 9 | 2 layers; PMI = 9 |
| Change | 29 | 10 | 1 layer; PMI = 10 | 10 | 2 layers; PMI = 10 |
| Change | 29 | 11 | 1 layer; PMI = 11 | 11 | 2 layers; PMI = 11 |
| Change | 29 | 12 | 1 layer; PMI = 12 | 12 | 2 layers; PMI = 12 |
| Change | 29 | 13 | 1 layer; PMI = 13 | 13 | 2 layers; PMI = 13 |
| Change | 29 | 14 | 1 layer; PMI = 14 | 14 | 2 layers; PMI = 14 |
| Change | 29 | 15 | 1 layer; PMI = 15 | 15 | 2 layers; PMI = 15 |
| Change | 29 | 16 | 1 layer; PMI = 16 | 16 | 3 layers; PMI = 0 |
| Change | 29 | 17 | 1 layer; PMI = 17 | 17 | 3 layers; PMI = 1 |
| Change | 29 | 18 | 1 layer; PMI = 18 | 18 | 3 layers; PMI = 2 |
| Change | 29 | 19 | 1 layer; PMI = 19 | 19 | 3 layers; PMI = 3 |
| Change | 29 | 20 | 1 layer; PMI = 20 | 20 | 3 layers; PMI = 4 |
| Change | 29 | 21 | 1 layer; PMI = 21 | 21 | 3 layers; PMI = 5 |
| Change | 29 | 22 | 1 layer; PMI = 22 | 22 | 3 layers; PMI = 6 |
| Change | 29 | 23 | 1 layer; PMI = 23 | 23 | 3 layers; PMI = 7 |
| Change | 29 | 24 | 2 layers; PMI = 0 | 24 | 3 layers; PMI = 8 |
| Change | 29 | 25 | 2 layers; PMI = 1 | 25 | 3 layers; PMI = 9 |
| Change | 29 | 26 | 2 layers; PMI = 2 | 26 | 3 layers; PMI = 10 |
| Change | 29 | 27 | 2 layers; PMI = 3 | 27 | 3 layers; PMI = 11 |
| Change | 29 | 28 | 2 layers; PMI = 4 | 28 | 4 layers; PMI = 0 |
| Change | 29 | 29 | 2 layers; PMI = 5 | 29~31 | Reserved |
| Change | 29 | 30 | 2 layers; PMI = 6 | | |
| Change | 29 | 31 | 2 layers; PMI = 7 | | |
| Change | 30 | 0 | 2 layers; PMI = 8 | | |
| Change | 30 | 1 | 2 layers; PMI = 9 | | |
| Change | 30 | 2 | 2 layers; PMI = 10 | | |
| Change | 30 | 3 | 2 layers; PMI = 11 | | |
| Change | 30 | 4 | 2 layers; PMI = 12 | | |
| Change | 30 | 5 | 2 layers; PMI = 13 | | |
| Change | 30 | 6 | 2 layers; PMI = 14 | | |
| Change | 30 | 7 | 2 layers; PMI = 15 | | |
| Change | 30 | 8~31 | Reserved | | |

TABLE 6

| | | One activated TB | | Two activated TBs | |
|---|---|---|---|---|---|
| NDI1 | MCS1 | Precoding information domain | Indication information | Precoding information domain | Indication information |
| Change | 29 | 0 | 1 layer; PMI = 0 | 0 | 2 layers; PMI = 0 |
| Change | 29 | 1 | 1 layer; PMI = 1 | 1 | 2 layers; PMI = 1 |
| Change | 29 | 2 | 1 layer; PMI = 2 | 2 | 2 layers; PMI = 2 |
| Change | 29 | 3 | 1 layer; PMI = 3 | 3 | 2 layers; PMI = 3 |
| Change | 29 | 4 | 1 layer; PMI = 4 | 4 | 2 layers; PMI = 4 |
| Change | 29 | 5 | 1 layer; PMI = 5 | 5 | 2 layers; PMI = 5 |
| Change | 29 | 6 | 1 layer; PMI = 6 | 6 | 2 layers; PMI = 6 |
| Change | 29 | 7 | 1 layer; PMI = 7 | 7 | 2 layers; PMI = 7 |
| Change | 29 | 8 | 1 layer; PMI = 8 | 8 | 2 layers; PMI = 8 |
| Change | 29 | 9 | 1 layer; PMI = 9 | 9 | 2 layers; PMI = 9 |
| Change | 29 | 10 | 1 layer; PMI = 10 | 10 | 2 layers; PMI = 10 |
| Change | 29 | 11 | 1 layer; PMI = 11 | 11 | 2 layers; PMI = 11 |
| Change | 29 | 12 | 1 layer; PMI = 12 | 12 | 2 layers; PMI = 12 |
| Change | 29 | 13 | 1 layer; PMI = 13 | 13 | 2 layers; PMI = 13 |
| Change | 29 | 14 | 1 layer; PMI = 14 | 14 | 2 layers; PMI = 14 |
| Change | 29 | 15 | 1 layer; PMI = 15 | 15 | 2 layers; PMI = 15 |
| Change | 29 | 16 | 1 layer; PMI = 16 | 16 | 3 layers; PMI = 0 |
| Change | 29 | 17 | 1 layer; PMI = 17 | 17 | 3 layers; PMI = 1 |
| Change | 29 | 18 | 1 layer; PMI = 18 | 18 | 3 layers; PMI = 2 |
| Change | 29 | 19 | 1 layer; PMI = 19 | 19 | 3 layers; PMI = 3 |

TABLE 6-continued

| | | One activated TB | | Two activated TBs | |
|---|---|---|---|---|---|
| NDI1 | MCS1 | Precoding information domain | Indication information | Precoding information domain | Indication information |
| Change | 29 | 20 | 1 layer; PMI = 20 | 20 | 3 layers; PMI = 4 |
| Change | 29 | 21 | 1 layer; PMI = 21 | 21 | 3 layers; PMI = 5 |
| Change | 29 | 22 | 1 layer; PMI = 22 | 22 | 3 layers; PMI = 6 |
| Change | 29 | 23 | 1 layer; PMI = 23 | 23 | 3 layers; PMI = 7 |
| Change | 29 | 24~31 | Reserved | 24 | 3 layers; PMI = 8 |
| Change | 30 | 0 | 2 layers; PMI = 0 | 25 | 3 layers; PMI = 9 |
| Change | 30 | 1 | 2 layers; PMI = 1 | 26 | 3 layers; PMI = 10 |
| Change | 30 | 2 | 2 layers; PMI = 2 | 27 | 3 layers; PMI = 11 |
| Change | 30 | 3 | 2 layers; PMI = 3 | 28 | 4 layers; PMI = 0 |
| Change | 30 | 4 | 2 layers; PMI = 4 | 29~31 | Reserved |
| Change | 30 | 5 | 2 layers; PMI = 5 | | |
| Change | 30 | 6 | 2 layers; PMI = 6 | | |
| Change | 30 | 7 | 2 layers; PMI = 7 | | |
| Change | 30 | 8 | 2 layers; PMI = 8 | | |
| Change | 30 | 9 | 2 layers; PMI = 9 | | |
| Change | 30 | 10 | 2 layers; PMI = 10 | | |
| Change | 30 | 11 | 2 layers; PMI = 11 | | |
| Change | 30 | 12 | 2 layers; PMI = 12 | | |
| Change | 30 | 13 | 2 layers; PMI = 13 | | |
| Change | 30 | 14 | 2 layers; PMI = 14 | | |
| Change | 30 | 15 | 2 layers; PMI = 15 | | |
| Change | 30 | 8~31 | Reserved | | |

As for the dual-antenna UE, only 2 bits precoding information domain are needed in the DCI. When the BS dispatches the UE and sends two TBs, 2 bits precoding information domain is used for indicating the 1 possible layer number and precoding matrix obtained from the above analysis.

Correspondingly, after the dual-antenna UE receives the DCI, if it is determined that the BS dispatches two TBs, the information for indicating the layer numbers and precoding matrixes of the two TBs is obtained from the 2 bits precoding information domain.

When the BS dispatches the UE and merely sends one TB, the combination of two different values of NDI1 domain and MCS1 domain is used for indicating the inactivation of TB1. For instance, NDI indicates new data (i.e., the change of NDI), meanwhile the value of MCS1 domain is 29 or 30. The combination of these two different values actually equals to 1 bit information. Thus, 3 bits may be obtained by combing the 1 bit information and 2 bits precoding information domain to indicate 6 kinds of possible information of the layer numbers and precoding matrixes obtained from the above analysis. This situation is shown in Table 7. Correspondingly, when the UE receives the DCI, if it is determined that the BS dispatches one TB, the information for indicating the layer number and the precoding matrix of TB0 may be obtained from the combination of the values in the NDI1 domain and MCS1 domain for indicating the inactivation of TB1 and 2 bits precoding information domain.

In addition, the DCI may require only one bit precoding information domain. When the BS dispatches the UE and sends two TBs, 1 bit precoding information domain may be used for indicating 1 kind of possible information of layer number and precoding matrix obtained from the above analysis. When the BS dispatches UE and only sends one TB, the combination of three different values of the NDI1 domain and MCS1 domain is used for indicating the inactivation of TB1. For instance, the NDI1 domain indicates new data, while the value of MCS1 ranges from 29 to 31. The 6 kinds of possible information of the layer numbers and precoding matrixes obtained from the above analysis may be indicated with the combination of the three different values and one bit precoding information domain. The situation is shown in Table 8.

TABLE 7

| | | One activated TB | | Two activated TBs | |
|---|---|---|---|---|---|
| NDI1 | MCS1 | Precoding information domain | Indication information | Precoding information domain | Indication information |
| Change | 29 | 0 | 1 layer; PMI = 0 | 0 | 2 layers; PMI = 0 |
| Change | 29 | 1 | 1 layer; PMI = 1 | 1~3 | Reserved |
| Change | 29 | 2 | 1 layer; PMI = 2 | | |
| Change | 29 | 3 | 1 layer; PMI = 3 | | |
| Change | 30 | 0 | 1 layer; PMI = 4 | | |
| Change | 30 | 1 | 1 layer; PMI = 5 | | |
| Change | 30 | 2~3 | Reserved | | |

TABLE 8

| | | One activated TB | | Two activated TBs | |
|---|---|---|---|---|---|
| NDI1 | MCS1 | Precoding information domain | Indication information | Precoding information domain | Indication information |
| Change | 29 | 0 | 1 layer; PMI = 0 | 0 | 2 layers; PMI = 0 |
| Change | 29 | 1 | 1 layer; PMI = 1 | 1 | Reserved |
| Change | 30 | 0 | 1 layer; PMI = 2 | | |
| Change | 30 | 1 | 1 layer; PMI = 3 | | |
| Change | 31 | 0 | 1 layer; PMI = 4 | | |
| Change | 31 | 1 | 1 layer; PMI = 5 | | |

It can be seen from the above description that exemplary embodiments of the present invention adequately use the characteristic that bit numbers needed for indicating the information of the layer numbers and precoding matrixes when one TB is dispatched is larger than that needed when two TBs are dispatched. The situation of dispatching two TBs is distinguished from that of dispatching one TB. When one TB is dispatched, the redundant information in the DCI is used for aiding the precoding information domain in indicating the information of the layer numbers and the precoding matrixes. Thereby, bit numbers of the precoding information domain are saved, and the signaling overheads of the DCI are reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A Multi-Input Multi-Output (MIMO) transmission based method for transmitting Downlink Control Information (DCI), the method comprising:
    determining the number of Transport Blocks (TBs) currently needed to be dispatched;
    when two TBs are currently needed to be dispatched, indicating information of layer numbers and precoding matrixes of uplink MIMO transmission with a precoding information domain in DCI for dispatching the uplink MIMO transmission, and transmitting the DCI;
    when one TB is currently needed to be dispatched, indicating the information of the layer numbers and precoding matrixes of the uplink MIMO transmission with redundant information in the DCI and precoding information domain, and transmitting the DCI.

2. An apparatus for transmitting Downlink Control Information (DCI) in a Multi-Input Multi-Output (MIMO) transmission based system, the apparatus comprising:
    a controller for determining the number of Transport Blocks (TBs) that need to be transmitted currently, wherein the controller is configured such that when two TBs need to be transmitted currently, the controller represents information of precoding matrixes and layer numbers for uplink MIMO transmission through a precoding information domain of DCI for uplink MIMO transmission, and such that when one TB needs to be transmitted currently, the controller represents information of precoding matrixes and layer numbers for uplink MIMO transmission through the precoding information domain and redundant information within the DCI; and
    a transceiver for transmitting the DCI.

3. The method according to claim 1, wherein the redundant information comprises a New Data Indication (NDI) domain corresponding to another TB in the DCI.

4. The method according to claim 1, wherein the redundant information comprises a combination of a New Data Indication (NDI) domain and a Modulation and Coding Scheme (MCS) domain corresponding to another TB in the DCI, or the MCS domain corresponding to another TB in the DCI.

5. The method according to claim 1, wherein the redundant information comprises partial or all of information combinations for indicating inactivation of another TB in a New Data Indication (NDI) domain and Modulation and Coding Scheme (MCS) domain corresponding to another TB,
    wherein the information combinations for indicating the inactivation of another TB in the NDI domain and MCS domain corresponding to another TB comprise the NDI domain corresponding to another TB for indicating new data, and values of the MCS domain corresponding to another TB being one of 29, 30, and 31, and
    wherein the value of the MCS domain is used for indicating the layer numbers of the uplink MIMO transmission.

6. The method according to claim 1, wherein the value of a New Data Indication (NDI) domain is used for indicating layer numbers of the uplink MIMO transmission when the redundant information comprises the NDI domain corresponding to another TB in the DCI.

7. A Multi-Input Multi-Output (MIMO) transmission based method for receiving Downlink Control Information (DCI), the method comprising:
    receiving DCI for dispatching uplink MIMO transmission;
    obtaining information for indicating layer numbers and precoding matrixes of the uplink MIMO transmission from a precoding information domain of the DCI if the DCI indicates that two TBs are dispatched; and
    obtaining the information for indicating the layer numbers and precoding matrixes of the uplink MIMO transmission from redundant information and the precoding information domain of the DCI if one Transport Block (TB) is dispatched.

8. An apparatus for receiving Downlink Control Information (DCI) in a Multi-Input Multi-Output (MIMO) transmission based system, the apparatus comprising:
    a transceiver for receiving the DCI for uplink MIMO transmission; and
    a controller for, when the DCI represents that two Transport Blocks (TBs) are transmitted, obtaining information for representing layer numbers and precoding matrixes for the uplink MIMO transmission from a precoding information domain of the DCI, and for, when the DCI represents that one TB is transmitted, obtaining information for representing precoding matrixes and layer numbers of the uplink MIMO transmission from the precoding information domain and redundant information of the DCI.

9. The method according to claim 7, wherein the redundant information comprises a New Data Indication (NDI) domain corresponding to another TB in the DCI.

10. The method according to claim 7, wherein the redundant information comprises a combination of a New Data Indication (NDI) domain and a Modulation and Coding Scheme (MCS) domain corresponding to another TB in the DCI, or the MCS domain corresponding to another TB in the DCI.

11. The method according to claim 7, wherein the redundant information comprises partial or all of information combinations for indicating inactivation of another TB in a New Data Indication (NDI) domain and a Modulation and Coding Scheme (MCS) domain corresponding to another TB,
    wherein the information combinations for indicating the inactivation of another TB in the NDI domain and MCS domain corresponding to another TB comprise the NDI domain corresponding to another TB for indicating new data, and values of the MCS domain corresponding to another TB being one of 29, 30, and 31, and
    wherein the value of the MCS domain is used for indicating the layer numbers of the uplink MIMO transmission.

12. The method according to claim 7, wherein the value of a New Data Indication (NDI) domain is used for indicating layer numbers of the uplink MIMO transmission when the redundant information comprises the NDI domain corresponding to another TB in the DCI.

13. The apparatus according to claim 2, wherein the redundant information comprises a New Data Indication (NDI) domain corresponding to another TB in the DCI.

14. The apparatus according to claim 2, wherein the redundant information comprises a combination of a New Data Indication (NDI) domain and a Modulation and Coding Scheme (MCS) domain corresponding to another TB in the DCI, or the MCS domain corresponding to another TB in the DCI.

15. The apparatus according to claim 2, wherein the redundant information comprises partial or all of information combinations for indicating inactivation of another TB in a New Data Indication (NDI) domain and a Modulation and Coding Scheme (MCS) domain corresponding to another TB,
   wherein the information combinations for indicating the inactivation of another TB in the NDI domain and MCS domain corresponding to another TB comprise the NDI domain corresponding to another TB for indicating new data, and values of the MCS domain corresponding to another TB being one of 29, 30, and 31, and
   wherein the value of the MCS domain is used for indicating the layer numbers of the uplink MIMO transmission.

16. The apparatus according to claim 2, wherein the value of a New Data Indication (NDI) domain is used for indicating layer numbers of the uplink MIMO transmission when the redundant information comprises the NDI domain corresponding to another TB in the DCI.

17. The apparatus according to claim 8, wherein the redundant information comprises a New Data Indication (NDI) domain corresponding to another TB in the DCI.

18. The apparatus according to claim 8, wherein the redundant information comprises a combination of a New Data Indication (NDI) domain and a Modulation and Coding Scheme (MCS) domain corresponding to another TB in the DCI, or the MCS domain corresponding to another TB in the DCI.

19. The apparatus according to claim 8, wherein the redundant information comprises partial or all of information combinations for indicating inactivation of another TB in a New Data Indication (NDI) domain and a MCS domain corresponding to another TB,
   wherein the information combinations for indicating the inactivation of another TB in the NDI domain and MCS domain corresponding to another TB comprise the NDI domain corresponding to another TB for indicating new data, and values of the MCS domain corresponding to another TB being one of 29, 30, and 31, and
   wherein the value of the MCS domain is used for indicating the layer numbers of the uplink MIMO transmission.

20. The apparatus according to claim 8, wherein the value of a New Data Indication (NDI) domain is used for indicating layer numbers of the uplink MIMO transmission when the redundant information comprises the NDI domain corresponding to another TB in the DCI.

* * * * *